United States Patent
Jensen

(10) Patent No.: US 6,691,727 B2
(45) Date of Patent: Feb. 17, 2004

(54) DEVICE AND METHOD FOR PROTECTING A SUBTERRANEAN PIPE FROM DAMAGE DURING EXCAVATION

(76) Inventor: Michael D. Jensen, 407 Columbia Ave., Lansdale, PA (US) 19446

( * ) Notice: Subject to any disclaimer, the term of this patent is extended or adjusted under 35 U.S.C. 154(b) by 0 days.

(21) Appl. No.: 09/874,048

(22) Filed: Jun. 6, 2001

(65) Prior Publication Data

US 2001/0039965 A1 Nov. 15, 2001

Related U.S. Application Data

(60) Provisional application No. 60/191,111, filed on Mar. 22, 2000.

(51) Int. Cl.[7] .................................................. F16L 5/00
(52) U.S. Cl. ............................... 137/15.08; 137/15.12; 137/363; 137/372
(58) Field of Search ........................... 137/15.12, 15.08, 137/372, 363

(56) References Cited

U.S. PATENT DOCUMENTS

| | | | |
|---|---|---|---|
| 2,649,769 A | * | 8/1953 | Kaiser ........................ 137/368 |
| 4,497,332 A | * | 2/1985 | Sewell et al. ................. 137/15 |
| 4,978,255 A | * | 12/1990 | Gale et al. ................... 408/1 R |
| 5,170,813 A | * | 12/1992 | Francis ......................... 137/15 |
| 5,732,732 A | * | 3/1998 | Gross et al. |

* cited by examiner

Primary Examiner—A. Michael Chambers
(74) Attorney, Agent, or Firm—LaMorte & Associates

(57) ABSTRACT

A system and method is claimed for protecting sections of a buried utility pipe that will eventually be excavated and exposed for tapping purposes. The system includes a protective collar that is applied to the utility pipe before the utility pipe is buried. When the utility pipe is to be tapped, the utility pipe is excavated directly above the protective collar. The presence of the protective collar provides a physical barrier that prevents the utility pipe from being damaged from the excavating equipment. When the protective collar is removed, a clean, unobstructed area of utility pipe is exposed on which a tapping procedure can be performed.

7 Claims, 4 Drawing Sheets

DEVICE AND METHOD FOR PROTECTING A SUBTERRANEAN PIPE FROM DAMAGE DURING EXCAVATION

RELATED APPLICATIONS

This application claims the benefit of U.S. Provisional Patent Application No. 60/191,111, entitled Displacement Pipe Collar, filed Mar. 22, 2000.

BACKGROUND OF THE INVENTION

1. Field of the Invention

In general, the present invention relates to protective devices that are used to protect subterranean pipes from damage during excavation. More particularly, the present invention relates to devices that protect subterranean pipes in areas that will be excavated for the purpose of tapping the subterranean pipe.

2. Prior Art Statement

In modern civil engineering design, utility pipes for water, gas, sewer and the like are commonly laid underground. In a large construction site, primary utility pipes are buried in a trench that is dug through or around the construction site. As different buildings are built on the construction site, secondary pipes are laid between the buildings and the primary utility pipes. In order to attach a secondary pipe to the primary utility pipe, a section of the primary utility pipe must be excavated, so as to be accessible by workers. Once a segment of the primary utility pipe is excavated, the primary utility pipe is tapped. It is through the tapping procedure that the primary utility pipe is interconnected to the smaller secondary pipes that lead to the individual buildings.

In a well planned construction site, the points at which the primary utility pipes will be tapped are known. As the primary utility pipes are laid and buried, the tapping points are typically marked above-ground with a flag or marking stick. When the time comes to tap the primary utility pipes, excavation crews excavate the earth around primary utility pipes in the areas marked. Typically, an excavation crew will use a backhoe to dig a large hole down to the depth of the primary utility pipe. Once the hole reaches the depth of the utility pipe, workers typically manually finish the excavation using shovels. Manual digging is commonly used around the primary utility pipes to prevent the bucket of a backhoe from inadvertently damaging the primary utility pipe.

When an excavation crew excavates a section of a primary utility pipe, the excavation crew digs around the primary utility pipe so that a portion of that pipe is suspended in the air. Dirt must be removed from around and below the exposed section of pipe so that tapping equipment can be attached to the exposed section of pipe without interference from the surrounding earth. There are many types of tapping equipment used to tap primary utility pipes. Examples of the tapping equipment are shown in U.S. Pat. No. 4,978,255 to Gale, entitled, Tapping Fluid Supply Pipes; U.S. Pat. No. 5,170,813 to Francis, entitled, Tapping Bands; and U.S. Pat. No. 5,732,732 to Gross, entitled, Tapping Fitting. Such prior art tapping equipment typically requires that earth be removed below the pipe, leaving a gap of at least two inches between the remaining earth and the exposed section of pipe.

A problem that exists with markers is that markers used above utility pipes are sometimes misplaced, inadvertently moved or buried. As a result, excavation crews attempting to excavate the primary utility pipe do not always know the exact location and/or depth of the primary utility pipe. As a result, an excavation crew may believe the utility pipe is in one location, when in reality it is in another location. As a result, excavation crews sometimes inadvertently contact a utility pipe with the bucket of the backhoe during the excavation process. When the bucket of a backhoe contacts a utility pipe, it may immediately rupture that pipe. This rupture is repaired by replacing the damaged section of pipe. This is a highly labor intensive process that requires a large excavation, the removal of the damaged section of pipe, and its replacement with a new section of pipe. Such repairs add greatly to the cost and time of the construction project.

Many times, during excavation, a backhoe may contact a utility pipe, but not rupture that pipe. When this happens, the bucket of a backhoe may scar the surface of the utility pipe. When a backhoe scars a pipe, the protective covering of the pipe is damaged. This causes a point on the pipe that is vulnerable to rust or other degradation caused by exposure to the surrounding earth. Such a scarred section of pipe may fail years before the other undamaged sections of the pipe. In order to prevent this, the damaged section of the utility pipe must be cleaned and the scar in the protective coatings repaired. This also is an expensive and labor intensive procedure.

A need therefore exists for a device and method of protecting section, of a primary utility pipe from damage when those sections of pipe are excavated for tapping purposes. A need also exists for a device and method that simplifies the process of excavating around a utility pipe once it is exposed. These needs are met by the present invention as is described and claimed below.

SUMMARY OF THE INVENTION

The present invention is a system and method for protecting sections of a buried utility pipe that will eventually be excavated and exposed for tapping purposes. The system includes a protective collar having a first end and a second end. The protective collar defines an opening of a first diameter that extends between the first end and the second end. The protective collar is comprised of at least two separable sections that can be separated along common seams that run between the first end and the second end. The protective collar has an enlarged region between its first end and its second end that has an annular cross-section. The enlarged section includes an inner wall of diameter that matches the utility pipe, and an outside wall of a larger second diameter. A gap exists between the inside wall and the outside wall. The gap is preferably at least two inches wide.

To utilize the protective collar in a method, the collar is attached to a utility pipe before the utility pipe is buried. When the utility pipe is to be tapped, the earth above one of the protective collars is excavated. The protective collar protects the utility pipe from the excavating equipment. Once the protective collar is exposed, the protective collar is removed. The removal of the protective collar leaves a section of the utility pipe exposed that is clean and free from any surrounding dirt. The utility pipe can then be tapped at this location.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention can be applied to most any type of pipe or conduit that is buried underground, such as an optical fiber line, electric supply line or the like, the present invention is especially well suited for use with utility supply lines, such as a water supply pipe or gas supply pipe. As such, by way of example, the technology of the present invention is illustrated and described as being applied to a utility supply pipe in order to set forth one of the best modes contemplated for the invention.

Figure 1:
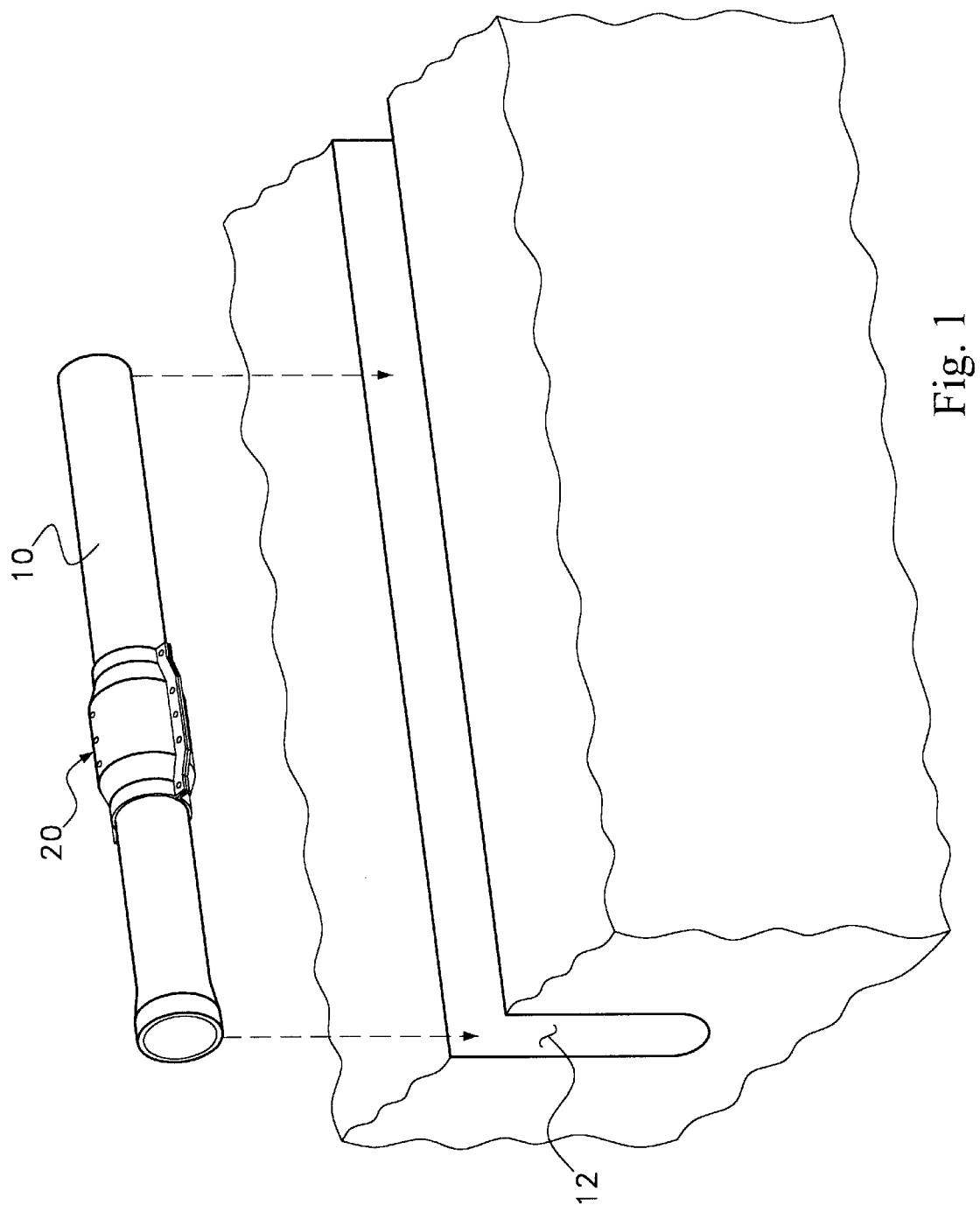
FIG. 1 is a perspective view of a section of utility pipe being laid in a trench, wherein an exemplary embodiment of the present invention protective collar is present on the utility pipe.

Referring to FIG. 1, a segment of a primary utility pipe 10 is shown prior to being installed. To lay the utility pipe 10, a trench 12 is dug into the ground. The utility pipe 10 is then laid in the trench 12 and made part of the utility pipeline. Once the utility pipe 10 is laid and connected, the trench 12 is back filled and the utility pipe 10 remains buried until particular sections of the utility pipe 10 are again excavated and exposed for tap connections to secondary piping. The sections of the utility pipe 10 that will eventually be excavated and exposed are known. The present invention device is a protective collar 20 that is placed onto the utility pipe 10 over the exact sections of the utility pipe 10 that will eventually be excavated and exposed. The protective collar 20 can be applied to the utility pipe 10 prior to the utility pipe 10 being laid in the trench 12 or can be applied to the utility pipe 10 once the utility pipe 10 is connected as part of a pipeline in the trench. The preferred application of the protective collar 20 depends upon the size of the trench, the width of the utility pipe, the type of utility pipe and the technique used to lay the utility pipe.

Figure 2:
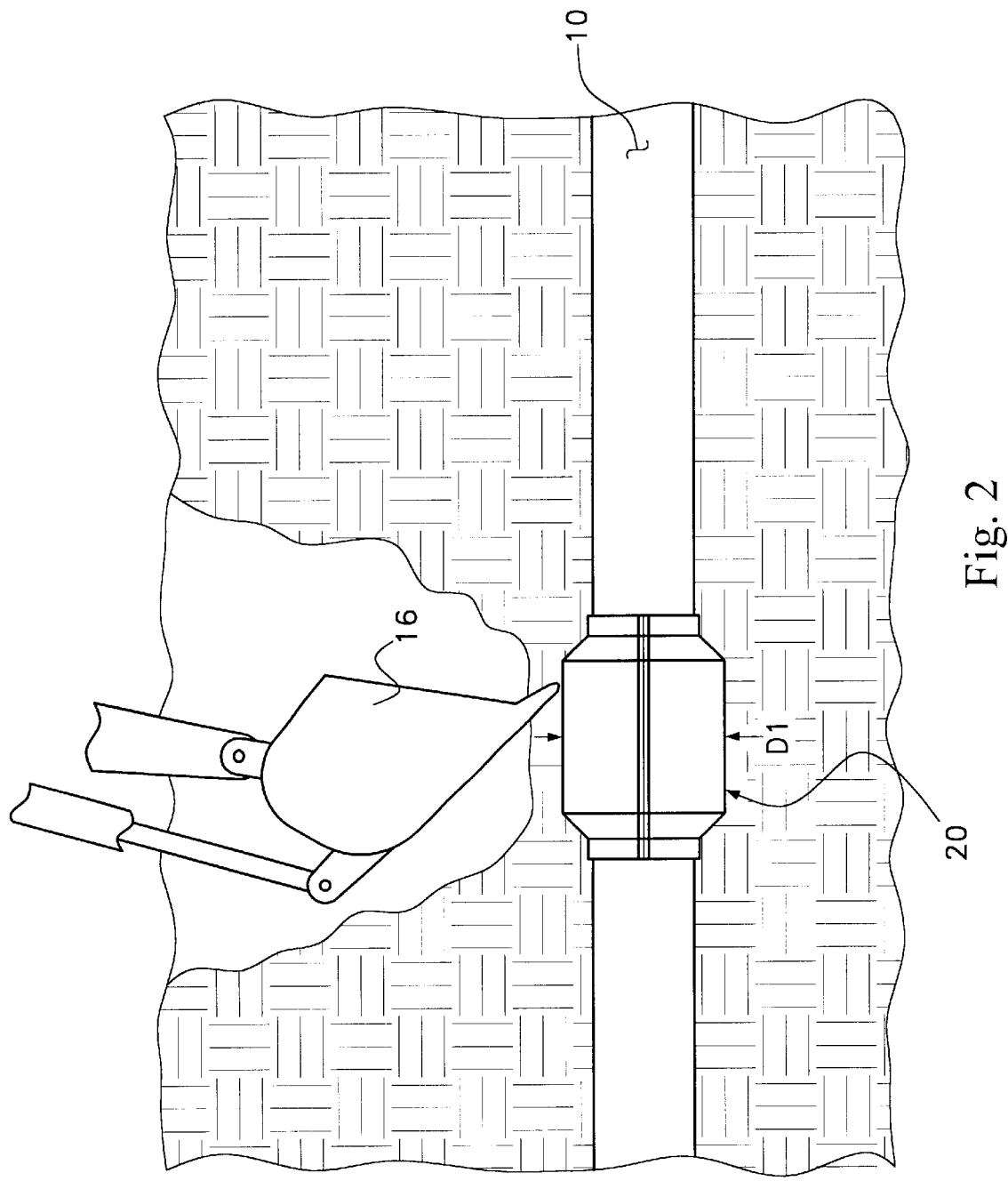
FIG. 2 is a side view of a buried utility pipe being excavated above the location of the present invention protective collar.

Once the protective collar 20 is installed on a utility pipe 10 and the utility pipe 10 is buried, the protective collar 20 serves a dual purpose. Referring to FIG. 2, it can be seen that the protective collar 20 covers the utility pipe 10 in the area of the pipe that will be excavated for tapping. As a backhoe excavates earth from above the utility pipe 10, the excavation occurs directly above the protective collar 20. Consequently, if the bucket 16 of a backhoe were to dig too close to the utility pipe 10, the bucket 16 would contact the protective collar 20 prior to the utility pipe 10 itself. Upon striking the protective collar 20, a backhoe operator would be warned to stop digging prior to damaging the utility pipe 10. As such, the protective collar 20 acts as a physical barrier between the utility pipe 10 and the excavating equipment. Accordingly, the protective collar 20 prevents a backhoe or rocks from scratching against the utility pipe 10 during excavation and scratching the protective coverings used on the utility pipe 10.

A backhoe typically uses a bucket that ranges in width from eight inches to thirty six inches, depending upon the size of the excavation. The protective collar 20 is preferably between eight inches and thirty six inches in length, depending upon the size of the utility pipe it is protecting and the size of the backhoe bucket that will be used during excavation. In this manner, the protective collar 20 can provide protection across the full width of backhoe bucket.

The second purpose of the protective collar 20 is to simplify the excavation process. The protective collar 20 has a diameter D1 that is larger than the diameter of the utility pipe 10. Accordingly, the presence of the protective collar 20 displaces earth away from the utility pipe 10. Once the protective collar 20 is exposed by excavation, the protective collar 20 is removed. This exposes an area around the utility pipe 10 that is clear of earth. Consequently, the earth around the utility pipe 10 does not have to be dug away by hand. Rather, by simply removing the protective collar 20, an open area is created that is clean and is sufficient in size to install tapping equipment around the utility pipe 10.

Figure 3:
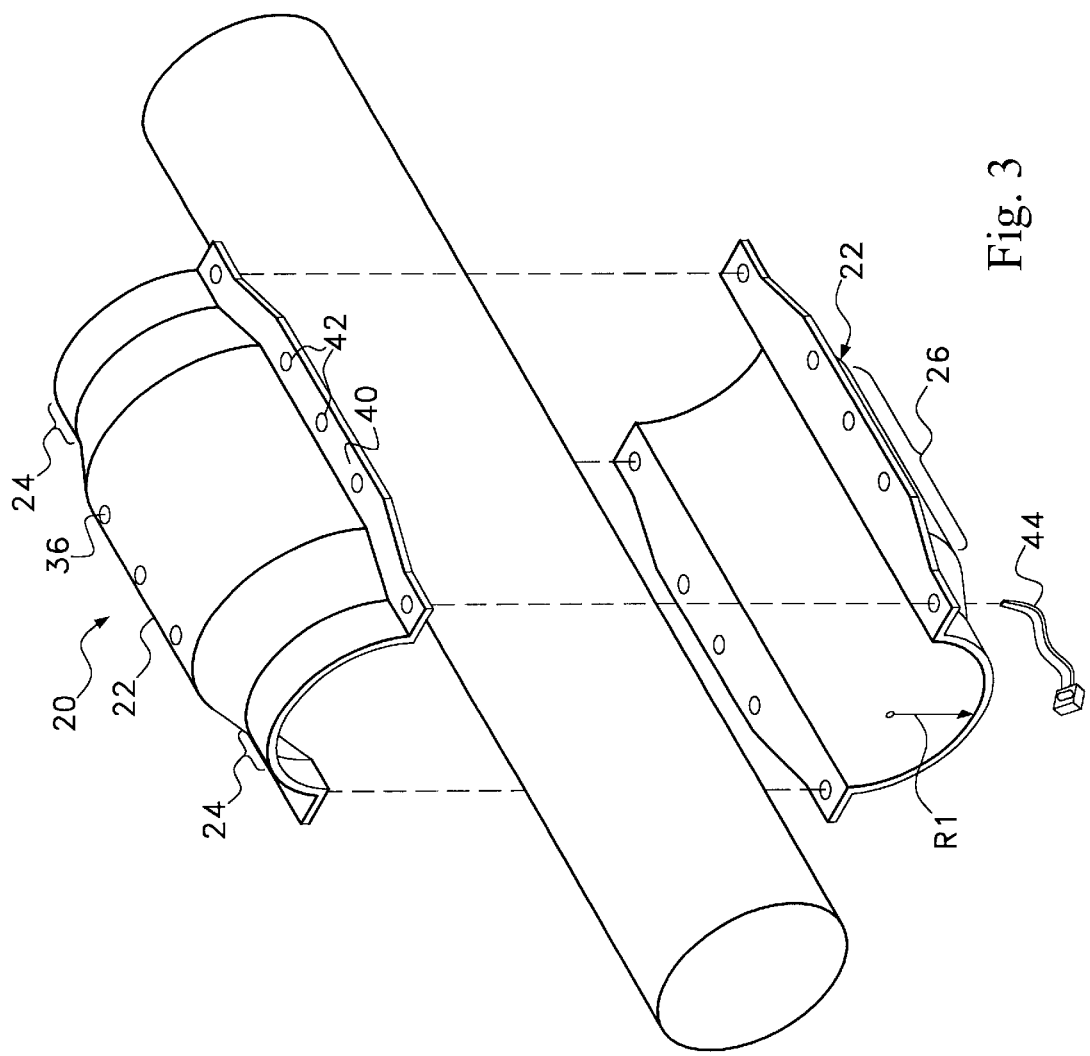
FIG. 3 is an exploded perspective view of a section of pipe surrounded by the present invention protective collar.

Referring to FIG. 3, it can be seen that the protective collar 20 is made of two halves 22. The two halves 22 are preferably identically formed so that the two halves 22 are interchangeable. Since the two halves 22 are preferably identical in structure, they are identified with a single reference number.

The two halves 22 are joined to create the protective collar 20. Each half 22 of the protective collar 20 has a front end and a back end. However, each half 22 of the protective collar is preferably symmetrically formed so that the front end and the back end can be reversed in direction with no effect on the protective collar 20. As such, the front end and back end are described as such, merely as a matter of convenience. A semicircular neck region 24 is present on each half 22 of the protective collar 20 proximate its front end and its back end. The neck region 24 has a radius of curvature R1 that matches the radius of the utility pipe 10 around which the protective collar 20 is being placed. As such, it will be understood that when the two halves 22 of the protective collar 20 are connected, the neck region 24 at the front end of the protective collar 20 and the neck region 24 at the backend of the protective collar 20 form cylindrical structures that conform to the exterior of the utility pipe 10. It is the cylindrical structures at both ends of protective collar 20 that prevent earth and other debris from entering the interior of the protective collar 20 when the protective collar 20 is buried.

Figure 4:
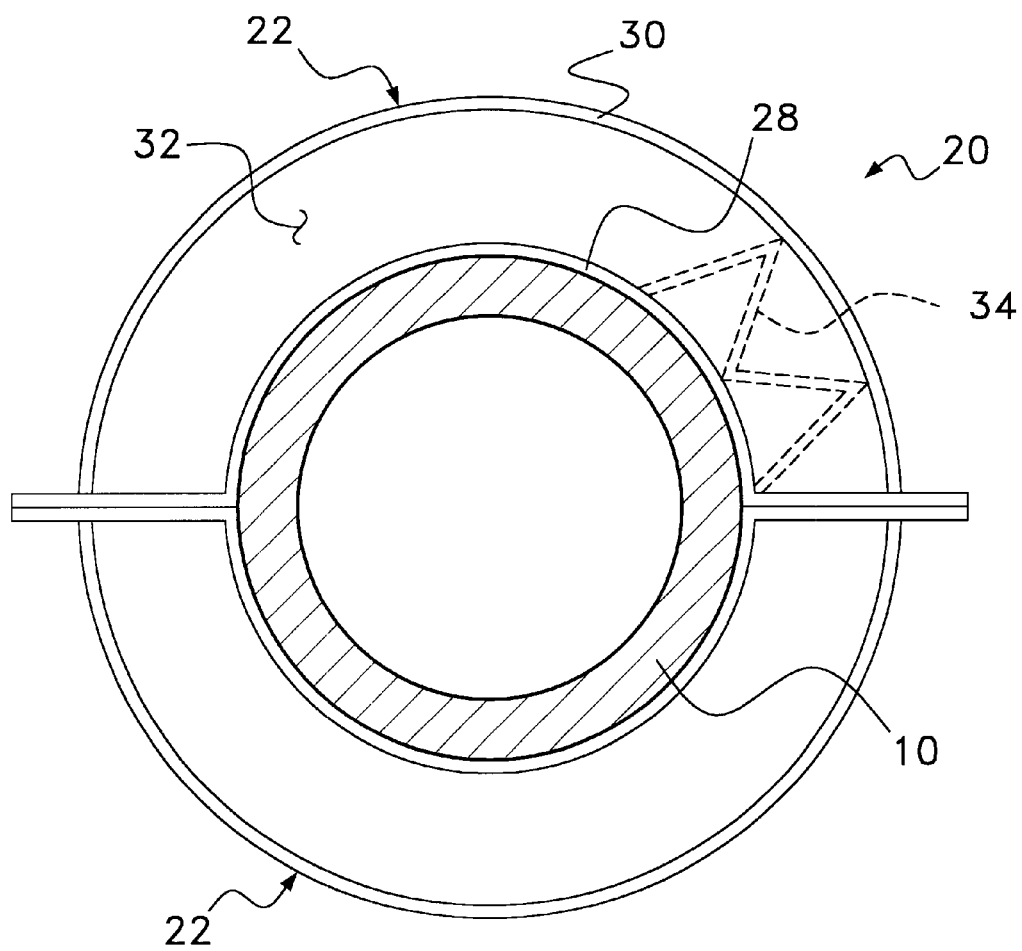
FIG. 4 is a cross-sectional view of the assembly shown in FIG. 3.

The center region 26 of each half 22 of the protective collar 20 is expanded. This enlarged center region 26 has an outside diameter D1 (FIG. 2) that is between two inches and ten inches larger than the outside diameter of the utility pipe 10. Referring to FIG. 4, it can be seen that when the two halves 22 of the protective collar 20 are joined around a utility pipe 10, the center region 26 (FIG. 3) of the protective collar creates an annular enclosure around the utility pipe 10. The annular enclosure has an inside diameter wall 28 that conforms to the exterior of the utility pipe 10 and an outside diameter wall 30 that has an outside diameter D1 (FIG. 2) that is between two inches and ten inches larger than the diameter of the utility pipe 10. A gap 32 exists between the inside diameter wall 28 and the outside diameter wall 30. This gap 32 is between one inch and five inches wide. In a preferred embodiment, the gap 32 is at least two inches wide.

The gap 32 between the inside diameter wall 28 and the outside diameter wall 30 is the space cushion provided by the protective collar 20. If the gap 32 is two inches wide, a backhoe can contact and deform this area of the protective collar 20 by two inches before the backhoe directly contacts the utility pipe 10. As such, the wider the gap 32 is, the more protection the utility pipe 10 is provided.

Each half 22 of the protective collar 20 is made of a material that is capable of being buried without being crushed. The material of the protective collar 20 is also preferably made of a material that is non-reactive in a subterranean environment. Suitable materials include, but are not limited to, inert casting metals, such as aluminum, and high strength plastics, such as poly vinyl chloride. Depending upon the strength of the materials and the size of the protective collar 20 manufactured, the gap 32 in between the inside diameter wall 28 and the outside diameter wall 30 may be either empty or supported by reinforcement ribs. In FIG. 4, the optional reinforcement ribs 34 are shown with hidden lines to indicate their optional use.

Returning to FIG. 3, it can be seen that both halves 22 of the protective collar contain drain holes 36. The drain holes 36 are provided to enable any water that may seep into the protective collar 20 to drain away. Also in FIG. 3, it can be seen that a flange 40 extends around the periphery of both halves 22 of the protective collar 20. When both halves 22 of the protective collar 20 are joined, the flanges 40 abut and create a seam. Holes 42 are formed through the flanges 40 at various points. When the two halves 22 of the protective collar 20 are joined, the holes 42 on the opposing halves 22 of the protective collar 20 align. Mechanical fasteners 44 can then be used to join the two halves 22 of the protective collar 20 together. In the shown embodiment, cable ties are used as the mechanical fasteners 44. However, other fasteners, such as nuts and bolts can also be used.

To use the present invention protective collar 20, the tapping point on a utility pipe 10 is first determined. The two halves 22 of the protective collar 20 are then placed around that tapping point and are joined together to form a complete protective collar 20. The utility pipe 10 is then buried, as is shown in FIG. 1. When the time comes to tap into the utility pipe, the earth is excavated directly above the protective collar 20, as is shown in FIG. 3. The protective collar 20 acts a physical barrier and prevents the utility pipe 10 from being directly contacted should the excavation equipment come too close to the utility pipe 10.

Once the protective collar 20 is exposed by excavation, the protective collar 20 is removed from the utility pipe 10. When the protective collar 20 is removed, a clean undamaged area of the utility pipe 10 is left exposed. Furthermore, by removing the protective collar 20, an area at least two inches wide surrounding the utility pipe 10 is left open. Given this amount of open space surrounding the utility pipe 10, standard tapping equipment can be attached to the utility pipe without the need for any further excavation. Accordingly, by providing the protective collar 20, the utility pipe is protected from damage. Furthermore, by removing the protective collar 20, the need to excavate around the utility pipe 10 and clean the utility pipe 10 is removed. The protective collar 20 that was removed can then be used again at a different location.

It will be understood that the embodiment of the present invention described and illustrated herein is merely exemplary aid a person skilled in the art can make many variations to the embodiment shown without departing from the scope of the present invention. For example, the protective collar can be formed into many shapes and configurations that differ from the exemplary embodiment shown. All such variations, modifications and alternate embodiments are intended to be included within the scope of the present invention as defined by the appended claims.

What is claimed is:

1. A method of protecting sections of a utility pipe that is to be buried, wherein said sections of that utility pipe are to be later excavated and exposed for tapping purposes, said method comprising the steps of:

determining the sections of the utility pipe that will be excavated and exposed for tapping purposes prior to said utility pipe being buried;

providing a removable protective collar for each of said sections;

installing a removable protective collar over said utility pipe in each of said sections that have been determined to be excavated and exposed;

burying said utility pipe with each said removable protective collar attached to said utility pipe;

excavating each of said sections of said utility pipe that are to he tapped, therein exposing said removable protective collar in each section; and removing said protective collar from the sections of the utility pipe after those sections are excavated thereby exposing said sections for a tapping procedure.

2. The method according to claim 1, wherein said protective collar is comprised of a plurality of interconnectable pieces, and said step of installing a removable protective collar includes assembling said interconnectable pieces around said sections of said utility pipe.

3. The method according to claim 2, wherein said step of removing said protective collar includes disconnecting said interconnectable pieces.

4. A method, comprising:

determining what sections of a utility pipe may be excavated in the future for tapping purposes, before the utility pipe is buried;

placing a protective collar around said utility pipe in each of said sections;

burying said utility pipe with each said protective collar that is attached to said utility pipe;

excavating said utility pipe above least one said protective collar, thereby exposing that protective collar; and removing said protective collar, therein leaving a section of said utility pipe ready for a tapping.

5. The method according to according to claim 4, wherein said protective collar is comprised of a plurality of interconnectable pieces, and said step of installing a removable protective collar includes assembling said interconnectable pieces around said sections of said utility pipe.

6. The method according to claim 4, wherein said step of removing said protective collar includes disconnecting said interconnectable pieces.

7. The method according to claim 6, wherein said protective collar is at least four inches wider than said utility pipe, wherein said step of removing said protective collar produces an open area at least two inches wide around said sections of said utility pipe.

* * * * *